United States Patent [19]
Sprague

[11] Patent Number: 5,931,188
[45] Date of Patent: Aug. 3, 1999

[54] DIAPHRAGM OPERATED REGULATOR VALVE FOR MAINTAINING LOW GAS PRESSURE

[75] Inventor: Charles F. Sprague, Houston, Tex.

[73] Assignee: Groth Corporation, Houston, Tex.

[21] Appl. No.: 09/028,566

[22] Filed: Feb. 24, 1998

[51] Int. Cl.⁶ .................................................. G05D 16/02
[52] U.S. Cl. .............................. 137/505.18; 137/505.47; 251/58
[58] Field of Search ........................ 137/505.18, 505.46, 137/505.47; 251/58

[56] References Cited

U.S. PATENT DOCUMENTS

| | | |
|---|---|---|
| 353,081 | 11/1886 | Patterson . |
| 566,452 | 8/1896 | Foster ..................................... 251/58 X |
| 870,526 | 11/1907 | Bossert ............................... 137/505.46 |
| 2,312,877 | 3/1943 | Campbell .............................. 251/58 X |
| 2,628,454 | 2/1953 | Mueller ........................... 137/505.47 X |
| 2,967,536 | 1/1961 | Stratman ........................ 137/505.18 X |
| 3,001,550 | 9/1961 | Engle et al. . |
| 3,111,957 | 11/1963 | Broughton . |
| 3,392,749 | 7/1968 | Gneiding et al. . |
| 3,545,471 | 12/1970 | Taplin . |
| 5,215,286 | 6/1993 | Kolenc ...................................... 251/58 |
| 5,238,021 | 8/1993 | Powell . |

OTHER PUBLICATIONS

Fisher Controls, S100 Series Gas Service Regulators, Feb. 1974, pp. 1–10, Bulletin 71.1:S100, Fisher Controls Company, Marshalltown, Iowa 50158.

*Primary Examiner*—Stephen M. Hepperle
*Attorney, Agent, or Firm*—Gary L. Bush, Esq.; Mayor, Day, Caldwell and Keeton, L.L.P.

[57] ABSTRACT

A gas regulator valve (14) for maintaining a preset low gas pressure in a storage tank (10). A fluid balanced piston valve member (32) is seated in a closed position on seat (40). A diaphragm actuator (70) has a diaphragm (76). A linkage including opposed link arms (106, 108) is positioned between the diaphragm (76) and the piston valve member (32) and a roller (104) supported on link arms (106, 108) contacts the valve member (32) for controlling the movement of the valve member (32) between open and closed positions. The inner upper ends of link arms (106, 108) are pivotally mounted on bracket (94) secured to the housing and the lower outer ends of the link arms (106, 108) are pivotally mounted on opposed brackets (88, 90) secured to the diaphragm (76). An axial movement of the diaphragm (76) of about two inches results in an axial movement of roller (104) and piston valve member (32) of about 0.20 inch to provide a ratio of about ten to one.

12 Claims, 3 Drawing Sheets

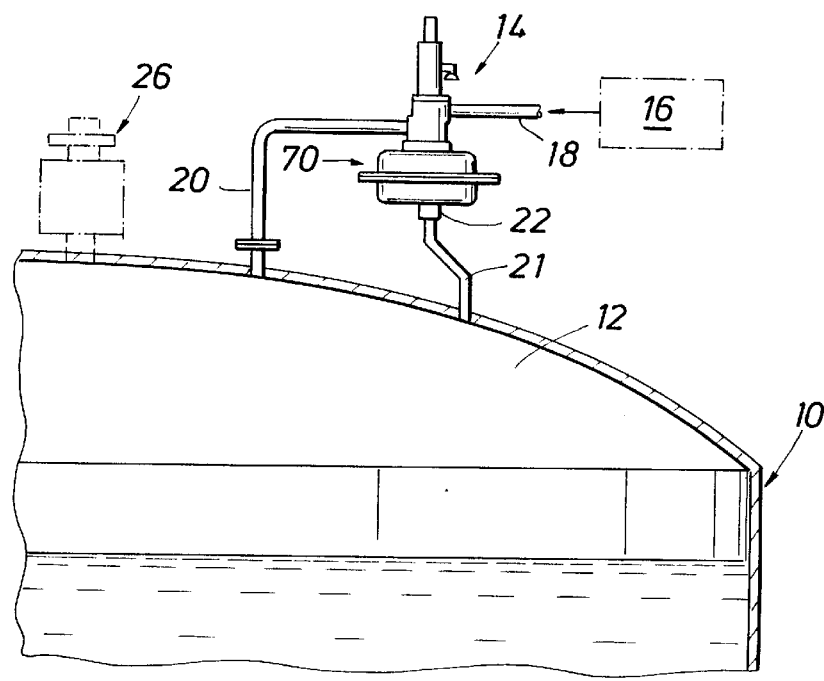
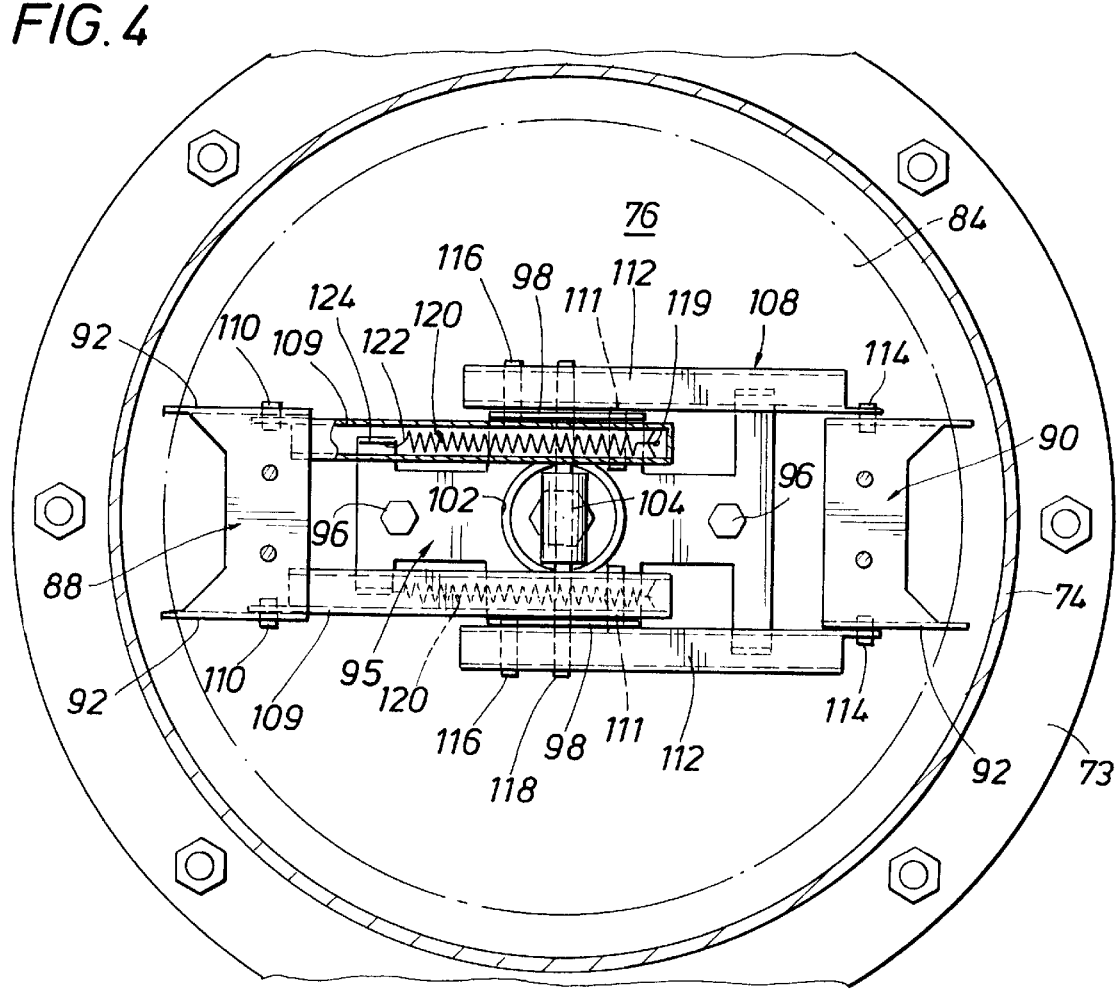

DIAPHRAGM OPERATED REGULATOR VALVE FOR MAINTAINING LOW GAS PRESSURE

FIELD OF THE INVENTION

This invention relates to a diaphragm operated regulator valve for maintaining a low gas pressure, and more particularly to such a regulator valve utilized for maintaining a preset low gas pressure in a storage tank or piping.

BACKGROUND OF THE INVENTION

Heretofore, such as shown in U.S. Pat. No. 5,238,021 dated Aug. 24, 1993, diaphragm operated regulator valves have been utilized to regulate the flow of compressed gas applied to a gas blanket on top of liquids in a storage tank and to other low pressure applications. The gas is normally a non-flammable gas, such as nitrogen. The diaphragm actuator in the '021 patent is relatively large and sometimes it is difficult to maintain a very low gas pressure less than about 0.10 psi in the gas blanket with a large diaphragm. For example, the regulator valve as shown in U.S. Pat. No. 5,238,021 if adapted for very low fluid pressures such as ½ inch we would require a relatively large diameter diaphragm housing or case which would not be suitable in some applications.

It is desirable that a diaphragm operated regulator valve for maintaining a preset low gas pressure in a storage tank be provided that has a relatively small diameter diaphragm and is particularly effective at gas pressures less than about 0.10 psi or under two inches water column (2" we).

SUMMARY OF THE INVENTION

The present invention is directed to a diaphragm actuated regulator valve that is particularly adapted for fluid regulator valves rated at extremely low fluid pressures such as ½ inch we. The diaphragm actuator has a mechanical linkage between the diaphragm and associated piston valve member of the regulator valve to provide a small axial movement of the piston valve member from a substantially larger axial movement of the diaphragm which is exposed to fluid pressure from a gas storage facility, such as a storage tank or fluid piping, for maintaining a preset low gas pressure in the storage facility. The mechanical advantage or leverage from the linkage of this invention amplifies the movement of the diaphragm relative to the movement of the associated piston valve member. Thus, the diaphragm is responsive to very low pressures such as set pressures as low as one half inch water column (½ inch wc).

The area of a diaphragm exposed to fluid pressure is an important parameter in determining the sensitivity or responsiveness of a regulator valve. Thus, increasing the area of the diaphragm and diaphragm plate increases the sensitivity of the regulator valve. However, when regulator valves are rated for an extremely low set pressure, such as ½ inch wc, the diaphragm case or housing is normally of a relatively large diameter such as a diameter over 24 inches, for example. It is desirable that the diaphragm case or housing, particularly for mounting in a restricted area, be less than about 24 inches, for example. In order to restrict the size of the diaphragm housing, the linkage of the present invention provides a mechanical advantage between the diaphragm and the moveable piston valve member of a regulator valve.

The mechanical linkage is positioned between a piston valve member and the diaphragm and has pairs of linkage arms pivotally mounted at outer ends to the diaphragm for movement therewith. The inner ends of the linkage arms are pivotally connected to the housing or case for the diaphragm. The diaphragm fluid chamber on the side of the diaphragm adjacent the piston valve member is in fluid communication with atmosphere and a fluid pressure chamber on the other side of the diaphragm is in fluid communication with the fluid storage facility in which it is desired to maintain the preset low gas pressure. The valve body has a valve chamber with an inlet in fluid communication with a pressurized gas source for the storage facility and an outlet that provides the low pressure gas fluid to the storage facility when the pressure within the storage facility reaches the preset low pressure. A piston valve member is fluid balanced and is not actuated by high fluid pressure from the pressurized gas source.

The inner ends of the opposed linkage arms support a roller which is in contact with the piston valve member in normal operating position to maintain the piston valve member in a closed position. The rotational axis of the roller is offset from the adjacent inner pivotal axes of the supporting linkage arms and the outer pivotal axes of the supporting linkage arms are mounted on the diaphragm plate for movement therewith. Upon movement of the diaphragm from a decrease in gas pressure in the storage tank to a predetermined low set pressure, the diaphragm moves downwardly along with the outer ends of the opposed linkage arms for pivoting of the inner ends of the opposed linkage arms and downward movement of the offset roller for opening of the piston valve member under the influence of the set compression spring. A ratio of about 10 to 1 is provided between the axial movement of the diaphragm and the axial movement of the piston valve member. Upon opening of the piston valve member, gas is supplied to the storage facility from the pressurized gas source. When the gas in the storage facility and diaphragm chamber increases to the preset pressure for the regulator valve, the diaphragm, along with the linkage arms, return to their original position for closing the piston valve member. The total axial diaphragm movement may, for example, be about 2 inches to result in an axial movement of the piston valve member of about 0.20 inch. As a result, the present invention permits the use of a relatively small diameter diaphragm actuator which is highly effective for regulator valves rated at very low set pressures.

Other features and advantages of the invention will be apparent from the following specification and drawing.

BRIEF DESCRIPTION OF THE DRAWINGS

FIG. 1 illustrates a typical tank storage facility in which a gas regulator valve in accordance with the present invention may be used to control the pressure of the gas blanket over liquids in the tank;

FIG. 4 is an enlarged bottom plan view of the diaphragm and linkage taken generally along line 4—4 of FIG. 3.

DESCRIPTION OF THE INVENTION

Figure 2:
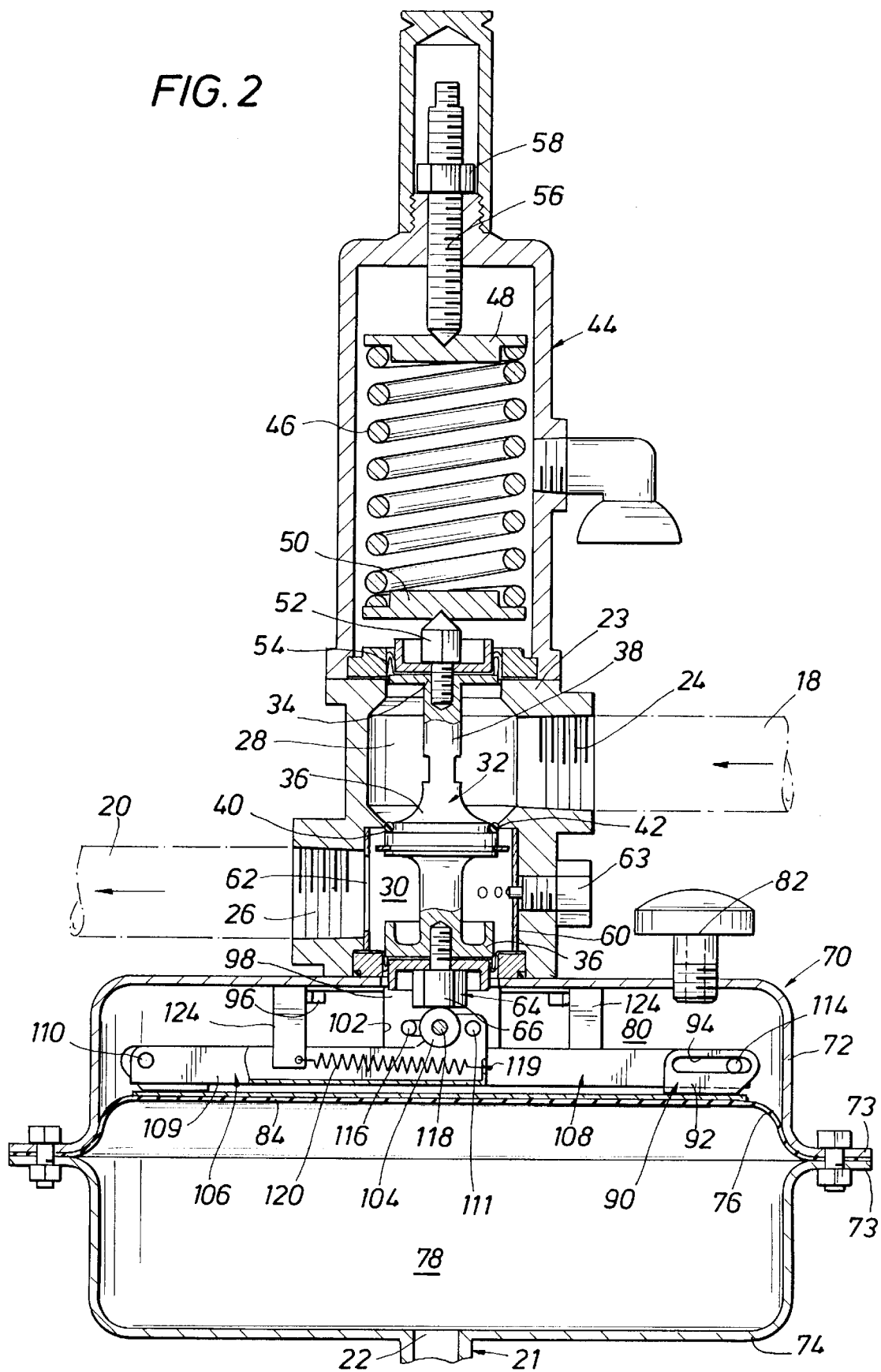
FIG. 2 is an enlarged sectional view of the gas regulator valve shown in FIG. 1 with the piston valve member in a closed position and the diaphragm and associated linkage in an upper normal operating position.

Referring now to the drawings for a better understanding of this invention, and more particularly to FIG. 1, a storage tank for liquids is shown generally at 10 having a gas blanket 12 over the liquid in the storage tank 10. Gas blanket 12 is maintained at a pre-selected pressure applied to tank 10 above the liquid. A suitable gas may be nitrogen or some other non-flammable gas. The invention described below is embodied in a gas regulator valve shown generally at 14 for maintaining the gas blanket 12 in tank 10 at a pre-selected pressure. A source of pressurized gas is shown at 16, and a supply line 18 extends to regulator valve 14. An outlet line 20 from regulator valve 14 supplies gas to blanket 12 upon opening of regulator valve 14 at a set low pressure as low as about ½ inch wc. A sensing line 21 from gas blanket 12 to regulator valve 14 has a sensing port 22 for sensing remotely. Regulator valve 14 compares the sensor pressure in sensing line 21 with a "set" pressure and opens to apply gas to blanket 12 through line 20 when the sensing pressure is below set pressure, but closes when the sensor pressure and sensing line 21 is equal to or above set pressure. Normally, a pilot operated safety relief valve shown generally at 26 is provided for tank 10 for actuation in the event that a predetermined high pressure is reached in tank 10.

Regulator valve 14 has a body 23 including an inlet port 24 connected to supply line 18 and an outlet port 26 connected to outlet line 20 to gas blanket 12. Body 23 has an upper valve chamber 28 communicating with port 24 and a lower valve chamber 30 communicating with port 26. A piston valve member generally indicated at 32 has an upper valve element 34, a lower valve element 36, and a main central valve element 38. Valve elements 34 and 36 are fluid balanced so that a fluid force differential is not created by high pressure from supply line 18. Body 23 has an annular seat 40 between upper valve chamber 28 and lower valve chamber 30. An O-ring 42 about valve element 36 seals against seat 40 in the closed position of piston valve member 32 as shown in FIG. 2 in normal operating position.

A bonnet generally indicated at 44 is secured to valve body 23 and houses a compression spring 46 therein. Compression spring 46 is mounted between upper and lower spring plates 48 and 50. Lower plate 50 engages a pin or spindle 52 which is connected to piston valve member 32 and secures a gasket 54 therebetween. An adjusting screw 56 engages upper plate 48 and has a lock nut 58 threaded thereon to secure adjusting screw 56 in a predetermined position. Adjusting screw 56 may be adjusted for compressing of spring 46 to a preset position for opening of piston valve member 32 at the set point for the low fluid pressure as will be described further. A sleeve 60 having an opening 62 is positioned about lower valve chamber 30 and may be adjusted by adjusting screw 63 received within registering openings in sleeve 60. A lower threaded bolt 64 is threaded within an internally threaded opening in piston valve member 32 and is effective to secure a gasket for sealing of piston valve member 32. Bolt 64 has a lower head 66 which is contacted as will be described further for movement of piston valve member 32 between open and closed positions relative to seat 40. For further details of piston valve member 32, reference is made to U.S. Pat. No. 5,238,021 dated Aug. 24, 1993, the entire disclosure of which is incorporated by this reference.

Diaphragm Actuator

An important feature of this invention comprises the diaphragm actuator generally indicated at 70. Diaphragm actuator 70 has an outer case or housing including an upper housing section 72 and a lower housing section 74 with opposed outer flanges 73 for gripping a diaphragm 76 therebetween. Diaphragm 76 divides actuator 70 into a lower fluid pressure chamber 78 in fluid communication with sensing line 21 to storage tank 10 and an upper fluid chamber 80 in fluid communication with atmosphere through a bug screen 82 which permits atmospheric pressure to enter chamber 80 but screens bugs and insects from upper chamber 80. Diaphragm 76 is positioned adjacent upper diaphragm plate 84. Mounted on the upper surface of upper plate 84 are a pair of opposed brackets 88 and 90 having upstanding slotted sides 92 with slots 94 therein. An upper bracket generally indicated at 95 is mounted on upper housing section 72 by bolts 96 and has downward extending slotted sides 98 defining slots 100. Bracket 95 has a central opening 102 to receive head 66 of bolt 64.

A linkage is mounted between upper fixed bracket 95 and lower diaphragm brackets 88, 90 to support a roller 104 in contact with head 66 to effect movement of piston valve member 32 between seated and unseated positions on seat 40. The linkage includes opposed linkage arms generally designated at 106 and 108. Linkage arm 106 includes a pair of inner arm portions 109 having lower ends pivotally mounted to bracket 88 by pivot pins 110 received within slots 94. The upper ends of inner arm portions 109 are mounted to upper bracket 95 by pivot pins 111 mounted within slots 100 of arms 98 for upper bracket 95. Linkage arm 108 includes a pair of outer arm portions 112 having lower ends connected by pivot pins 114 received within slots 94 of bracket 90. The upper ends of outer arm portions 112 are connected by pivot pins 116 received within elongated slots 100 of bracket arms 98 of upper bracket 95.

The upper ends of arms 106 and 108 have a roller pin or shaft 118 thereon to support roller 104 on the upper ends of arms 106 and 108. Roller shaft 118 is offset a predetermined distance from pivot axis 111 of arm 106 and pivot axis 116 of arm 108 to obtain the desired leverage. Each arm portion 109 and 112 has one end 119 of a tension spring 120 connected thereto. The other end 122 of each tension spring 120 is anchored to a tab 124 extending downwardly from upper housing section 72. Springs 120 continuously urge linkage arms 106, 108 and diaphragm 76 to the normal operating closed position of piston valve member 32 shown in FIG. 2. Springs 120 are effective to overcome any moment provided by the weight of linkage arms 106, 108 and diaphragm plate 84. In some instances, however, springs 120 may be omitted with satisfactory results.

Figure 3:
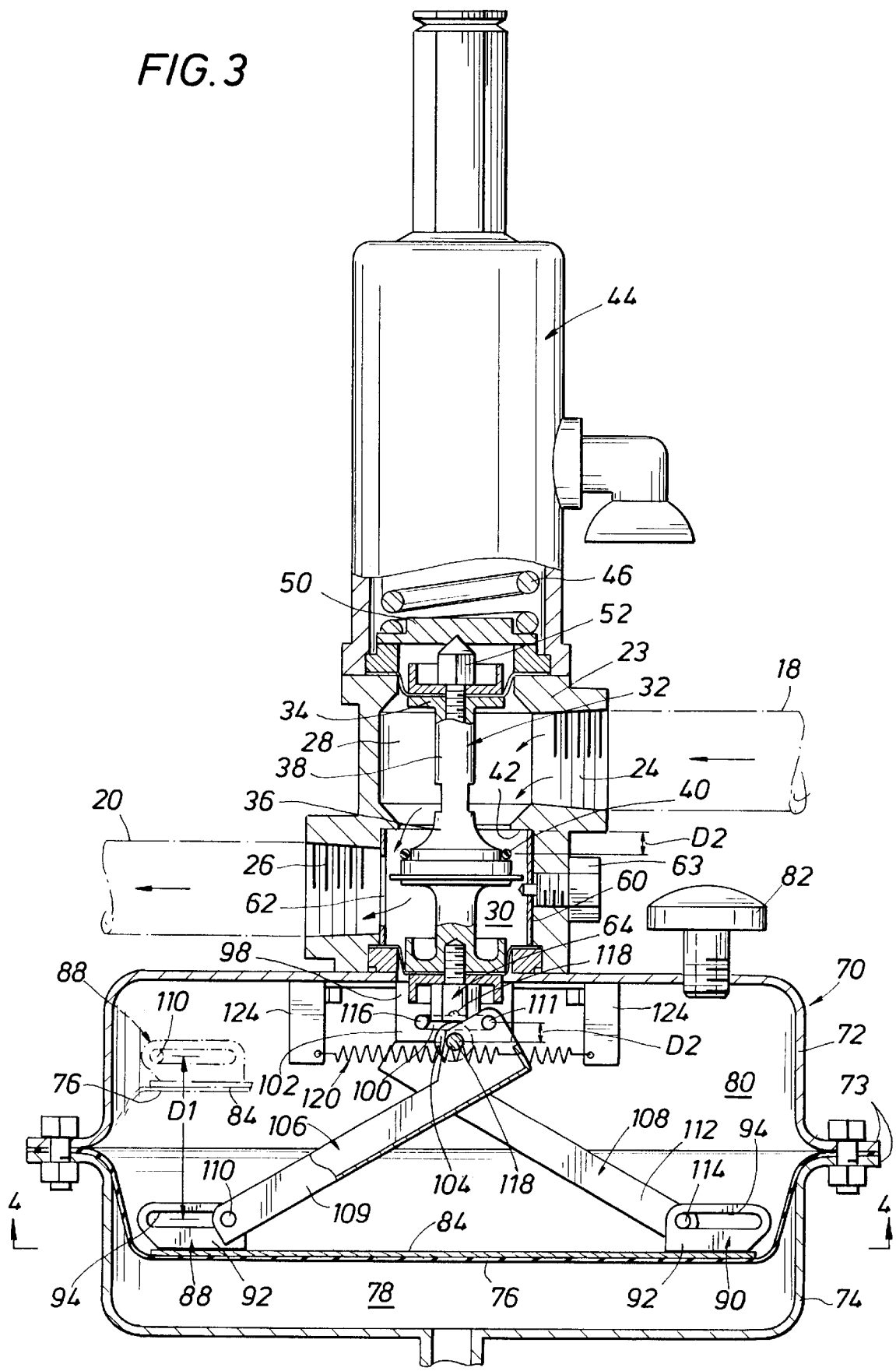
FIG. 3 is an enlarged sectional view of the gas regulator valve shown in FIG. 2 showing the diaphragm actuator in an actuated position with the piston valve member in an open position at a reduced gas pressure within the tank to provide low pressure gas to the tank until the gas pressure in the tank is returned to the preset gas pressure.

Diaphragm plate 84 mounted on the lower ends of arms 106 and 108 and adjacent diaphragm 76 move an axial distance D1 between the closed position of piston valve member 32 and the open position of piston valve member 32 shown in FIG. 3. The movement of diaphragm 76 to the open position shown in FIG. 3 results in an axial movement of roller 104 and an axial movement of piston valve member 32 of distance D2. Distance D1 is preferably about 10 times greater than distance D2 to provide a ratio of 10 to 1 between the axial movement of diaphragm 76 and the axial movement of piston valve member 32. The linkage thus provides a mechanical advantage and, for example, diaphragm 76 may move a distance D1 of about 2 inches with roller 104 and piston valve member 32 moving a distance D2 of about 0.20 inch. As a result, a low pressure regulator has been provided by the present invention which is responsive to unusually low set pressures, such as ½ inch wc, and a diaphragm case or housing of a relatively small diametrical dimension, such as twelve inches, for example, may be utilized.

Operation

In operation, regulator valve 14 is set at a predetermined pressure by adjusting screw 56. As long as the force of the pressure in lower chamber 78 of actuator 70 as amplified by the leverage times the effective area of diaphragm 76 is greater than the downward force of compression spring 46, regulator valve 14 remains closed and flow from inner supply line 18 to tank 10 is blocked by O-ring 42. After the pressure drops in tank 10 and lower chamber 78 below the set pressure, diaphragm 76 exposed to atmosphere in chamber 80 moves downwardly to the position of FIG. 3. Piston valve member 32 under the influence of set spring 46 moves to an open position and stays open until sufficient gas passes from supply line 18 to outlet line 20 to satisfy the demand of the gas blanket 12. Upon an increase in the gas pressure in lower chamber 78 from gas blanket 12 to the set pressure, diaphragm 76 and piston valve member 32 return to the position of FIG. 2 to block further flow of supply gas from supply line 18 to blanket 12.

Thus, the present invention by utilizing a linkage between the diaphragm and piston valve member obtains a mechanical advantage therebetween to permit the utilization of a relatively small area diaphragm so that a relatively small diameter diaphragm housing for diaphragm actuator 70 can be provided. While the height or thickness of the housing for the diaphragm actuator 70 may increase to compensate for the increased axial movement of diaphragm 76, the diameter of diaphragm 76 is minimized.

While a preferred embodiment of the present invention has been illustrated in detail, it is apparent that modifications and adaptations of the preferred embodiment will occur to those skilled in the art and it is to be expressly understood that such modifications and adaptations of the preferred embodiment will occur to those skilled in the art. However, it is to be expressly understood that such modifications and adaptations are within the spirit and scope of the present invention as set forth in the following claims.

What is claimed is:

1. A gas regulator valve for regulating the gas pressure applied to a storage facility from a source of pressurized gas comprising:

a valve body including a valve chamber having an inlet and an outlet, said inlet being in fluid communication with said pressurized gas source;

an annular valve seat in said valve chamber between said inlet and outlet;

a piston valve member mounted within said valve chamber for reciprocal movement between open and closed positions relative to said annular valve seat, said piston valve member having opposed equal fluid pressure areas in fluid communication with said pressurized gas source to provide a fluid balanced valve member;

a diaphragm actuator connected to said valve body having a housing and a diaphragm secured therein defining a sensing chamber on one side thereof in fluid communication with said storage facility and an atmospheric chamber in fluid communication with atmosphere on the opposite side of said diaphragm; and a linkage structure mounted within said housing between said diaphragm and said piston valve member for permitting movement of said piston valve member with said diaphragm; said linkage structure operatively connected to said diaphragm adjacent one end for axial movement with said diaphragm and pivotally connected adjacent an opposed end to said housing, said linkage structure being operatively connected to said piston valve member and arranged so that axial movement of said diaphragm is at least about five times greater than the resulting axial movement of said piston valve member to provide a regulator valve effective at gas pressures less than about 0.10 psi.

2. A gas regulator valve as set forth in claim 1 wherein said linkage structure includes a link arm pivotally connected adjacent one end to said diaphragm for axial movement therewith and pivotally connected adjacent an opposed end to said housing, said link arm being operatively connected to said piston valve member to effect movement of said piston valve member with said diaphragm, and means on said housing to permit transverse movement of said opposed end of said link arm relative to said housing.

3. A gas regulator valve as set forth in claim 2 wherein said linkage structure includes a roller connected to said linkage structure and in contact with said piston valve member to effect movement of said piston valve member.

4. A gas regulator valve as set forth in claim 1 wherein said linkage structure comprises a pair of opposed link arms pivotally connected adjacent their outer ends to diametrically opposite positions on said diaphragm, and pivotally connected adjacent their inner ends to said housing; said link arms being operatively connected to said piston valve member adjacent said inner ends, and means on said diaphragm to permit transverse movement of said outer ends of said link arms relative to said diaphragm.

5. A gas regulator valve as set forth in claim 4 wherein said linkage structure includes a roller supported by said opposed link arms and in contact with said piston valve member.

6. A gas regulator valve as set forth in claim 5 wherein diametrically opposed brackets are fixed to said diaphragm and the outer ends of said opposed link arms are pivotally supported on said brackets.

7. A gas regulator valve as set forth in claim 4 wherein a bracket is secured to said housing adjacent said piston valve member, and said inner ends of said link arms are pivotally connected to said bracket.

8. A gas regulator valve as set forth in claim 7 wherein a roller is supported adjacent said upper ends of said link arms and is in contact with said piston valve member.

9. A gas regulator valve for regulating the gas pressure applied to a storage facility from a source of pressurized gas comprising:

a valve body including a valve chamber having an inlet and an outlet, said inlet being in fluid communication with said pressurized gas source;

an annular valve seat in said valve chamber between said inlet and outlet;

a piston valve member mounted within said valve chamber for reciprocal movement between open and closed positions relative to said annular valve seat, said piston valve member having opposed equal fluid pressure areas in fluid communication with said pressurized gas source to provide a fluid balanced valve member;

a diaphragm actuator connected to said valve body having a housing and a diaphragm secured therein defining a sensing chamber on one side thereof in fluid communication with said storage facility and an atmospheric chamber in fluid communication with atmosphere on the opposite side of said diaphragm;

a set compression spring operatively connected to said piston valve member for urging said valve member to an unseated open position;

an adjustment screw for adjustment of said compression spring to vary selectively the force exerted by said spring against said piston valve member for unseating said piston valve member;

a pair of opposed elongate link arms mounted within said housing between said diaphragm and said piston valve member;

said link arms having inner ends pivotally mounted to said housing and having outer ends pivotally mounted to said diaphragm; and an actuating member adjacent said inner ends of said link arms operatively connected to said piston valve member to effect movement of said piston valve member with said diaphragm, said actuating member arranged to provide a mechanical advantage and to effect axial movement of said piston valve member an axial distance substantially less than the axial distance of said diaphragm upon axial movement of said diaphragm, said actuating member being supported on said link arms at a position sufficient to provide a ratio of at least about five to one between the axial movement of said diaphragm and the axial movement of said actuating member and Piston valve member to provide a regulator valve effective for low gas pressures.

10. A gas regulator valve as set forth in claim 9 wherein said actuating member comprises a roller supported on said link arms and movable therewith.

11. A gas regulator valve as set forth in claim 9 wherein:
diametrically opposed brackets are fixed to said diaphragm and the outer ends of said opposed link arm are pivotally supported on said brackets, said brackets including slots to permit transverse movement of said opposed link arms relative to said diaphragm.

12. A gas regulator valve as set forth in claim 9 wherein a bracket is secured to said housing adjacent said piston valve member, and said inner ends of said link arms are pivotally connected to said bracket, said brackets including slots to permit transverse movement of inner ends of said link arms relative to said piston valve member.

\* \* \* \* \*